United States Patent [19]

Sonoda et al.

[11] 4,002,727
[45] Jan. 11, 1977

[54] DESULFURIZATION PROCESS FOR HYDROGEN SULFIDE-CONTAINING GASES

[75] Inventors: Takezo Sonoda, Himeji; Masao Nakano, Hyogo; Michito Okane; Hideo Suzuki, both of Himeji, all of Japan

[73] Assignee: Nippon Shokubai Kagaku Kogyo Co., Ltd, Osaka, Japan

[22] Filed: Dec. 16, 1974

[21] Appl. No.: 532,856

[30] Foreign Application Priority Data

Dec. 18, 1973 Japan .............................. 48-14028

[52] U.S. Cl. .......................... 423/573 R; 423/224; 423/226
[51] Int. Cl.² ........................................ C01B 17/04
[58] Field of Search ........... 423/224, 226, 573, 575

[56] References Cited

UNITED STATES PATENTS

| 2,819,950 | 1/1958 | Patton | 423/573 |
| 3,459,495 | 8/1969 | Iida et al. | 423/226 |

FOREIGN PATENTS OR APPLICATIONS

| 672,084 | 10/1963 | Canada | 423/226 |
| 714,749 | 12/1941 | Germany | 423/575 |
| 958,078 | 5/1964 | United Kingdom | 423/573 |
| 341,684 | 1/1931 | United Kingdom | 423/573 |

*Primary Examiner*—G. O. Peters
*Attorney, Agent, or Firm*—Armstrong, Nikaido & Wegner

[57] ABSTRACT

In a process for desulfurizing hydrogen sulfide-containing gases by contacting a hydrogen sulfide-containing gas with an alkaline aqueous solution containing a naphthoquinonesulfonate to effect absorption of hydrogen sulfide by said aqueous solution and subjecting the effluent to catalytic oxidation by a molecular oxygen-containing gas to separate out sulfur, an improvement which comprises (a) carrying out the absorption of hydrogen sulfide by using a liquid absorbent having a pH value adjusted by means of ammonia to 8 to 10 and containing as catalyst components a naphthoquinonesulfonate and a variable valent metal compound, (b) carrying out the catalytic oxidation of the effluent containing absorbed therein hydrogen sulfide by means of a molecular oxygen-containing gas as to lower the concentration of hydrosulfide ion in the effluent to 70 ppm or less and (c) recirculating the said liquid absorbent or effluent to the contact with the said hydrogen sulfide-containing gas.

15 Claims, 1 Drawing Figure

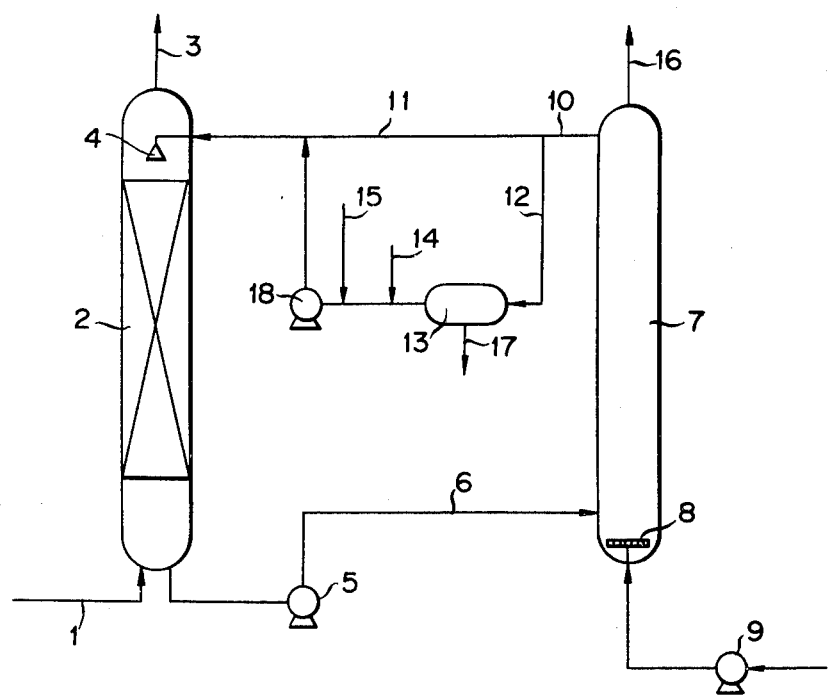

DESULFURIZATION PROCESS FOR HYDROGEN SULFIDE-CONTAINING GASES

This invention relates to a wet process for eliminating hydrogen sulfide from hydrogen sulfide-containing gases by absorption with an absorption solution to recover it in the form of elementary sulfur and, more particularly, to a process of recoverying elementary sulfur from hydrogen sulfide-containing gases by washing a hydrogen sulfide-containing gas, such as coke oven gases, petrocracking gases natural gas or waste gases exhausted from factories, with an alkaline aqueous solution to effect absorption of hydrogen sulfide by the aqueous solution and contacting the absorbed hydrogen sulfide with molecular oxygen in the presence of a catalyst contained in the aqueous solution to separate out elementary sulfur. Stating in more particular, the present invention relates to an improvement in a process for the recovery, in the form of elementary sulfur, of hydrogen sulfide contained in the hydrogen sulfide-containing gases by the use as an absorption solution of an aqueous solution containing as a catalyst a composition comprising as main component a naphthoquinonesulfonate and adjusted to an ammoniacal alkalinity.

Hitherto, there have been known several wet processes for the removal and recovery of hydrogen sulfide in the form of elementary sulfur from hydrogen sulfide-containing gases in which there is employed so called "organic redox catalysts", represented by Stretford process, Fumax process and Takahax process.

The Stretford proces employs an aqueous solution containing as catalyst components an anthraquinonedisulfonate and a vanadate. In this process, hydrogen sulfide is absorbed by the alkaline aqueous solution to form hydrosulfide ion which is then oxidized by the vanadate into elementary sulfur. The reduced vanadate is reoxidized by the anthraquinonedisulfonate and the thus reduced anthraquinonedisulfonate is oxidized by air to complete a "redox system" . However, this process needs an absorption solution containing a fairly large quantity of a vanadate and a large quantity of potassium sodium tartarate or sodium gluconate as a retainer of the vanadate and, in this process, it is necessary to subject the waste liquor to treatment by means of an ion exchanger for removal of the vanadate because it is not allowed to discharge the waste liquor as it is. In addition, the process needs a huge oxidation apparatus and a large quantity of air for oxidation because of a low oxidation rate attained by the redox catalyst consisting of an anthraquinonedisulfonate and a vanadate.

The Fumax process has drawbacks that picric acid employed in this process as an oxidation catalyst is an explosive and that the picric acid should be supplied in a large quantity in operation because nitro groups in picric acid are reduced to nitroso, hydroxylamino and, finally, amino groups to lose activity.

The Takahax process employs as a catalyst sodium naphthoquinonesulfonate and its actual results have been rated high in desulfurization of town gas, coke oven gas and like hydrogen sulfide-containing gases. This process is characterized by a high desulfurization efficiency and safety in operation. This process is well known in the art by the disclosure in French Pat. No. 1,462,810 (Japanese Pat. No. 427,094 (Publication No. 1015/1964)) and the desulfurization mechanism in this process has become widely known in the form of the following equations. When sodium hydroxide is used as an alkaline substance, gaseous hydrogen sulfide is absorbed in an aqueous sodium hydroxide solution to form sodium hydrosulfide as indicated by the equation I.

The sodium hydrosulfide is oxidized in the aqueous solution by the action of the catalyst, sodium naphthoquinonesulfonate, to separate out elementary sulfur as indicated by the following equation II.

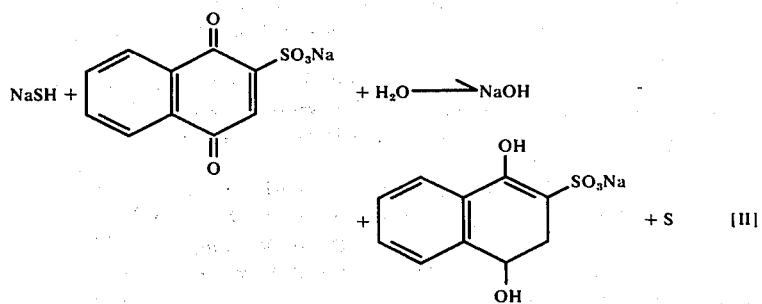

As the result, the catalyst is reduced to sodium naphthohydroquinonesulfonate, though it is regenerated to sodium naphthoquinonesulfonate by oxidation by means of molecular oxygen as indicated by the following equation III.

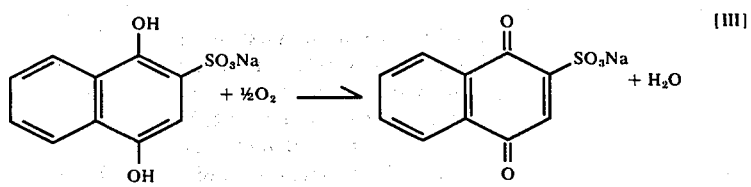

It is believed that the catalyst sodium naphthoquinonesulfonate pertains to separation of elementary sulfur as mentioned above as a catalyst of redox type.

This process is carried out in a plant comprising usually an absorption column in which hydrogen sulfide is absorbed by an aqueous alkaline solution and an oxidation column in which the absorbed hydrosulfide is oxidized by a molecular oxygen-containing gas, usually air, to deposit elementary sulfur, in the presence of a catalyst. In the practice of this process in commercial scale, there are employed as sources of the alkali contained in the absorption solution, in general, sodium hydroxide, sodium carbonate, sodium bicarbonate and like alkalis and as the catalyst sodium or potassium salt of 1,4-naphthoquinone-2-sulfonate.

However, it has been pointed out as a drawback of the above process that it needs presence of a large excess of molecular oxygen, i.e., supply of a large excess of air, in the oxidation step in the oxidation column because of a low reaction rate, i.e., a low rate of deposition of elementary sulfur. Accordingly, for treatment of large volumes of gases, such as coke oven gas, it inevitably needs a huge expensive plant and counter-plans against corrosion and other troubles.

The second drawback of these processes is that it is necessary for increasing the reaction rate to increase the concentration of catalyst in the absorption solution and this results in the increase in amount of catalyst used. As well known in the art, during removal of hydrogen sulfide from gases and subsequent oxidation thereof into elementary sulfur there occur side reactions in high ratios with formation of thiosulfates, sulfates and, in case of cyan-containing gases such as coke oven gas, rhodanates, and this makes it necessary to withdraw portion of the absorption solution to prevent accumulation of by-products in the absorption solution. The withdrawal of portion of the absorption solution necessarily accompanies discharge of portion of the catalyst contained in the solution. Accordingly, it would be concluded that the concentration of catalyst in the absorption solution should be maintained as low as possible.

Thus, it is strongly desired to cary out the intended oxidation, reactions, i.e., separation of elementary sulfur and regeneration of catalyst, using lesser amounts of a catalyst and molecuar oxygen.

Accordingly, an object of the present invention is to provide an improved wet process for the removal of hydrogen sulfide from hydrogen sulfide-containing gases and the recovery of the hydrogen sulfide in the form of elementary sulfur.

Another object of the present invention is to provide a desulfurization process in which hydrogen sulfide is absorbed in an absorption solution in high capacity and a hydrosulfide formed of hydrogen sulfide absorbed in an absorption solution is oxidized at a high rate and the same percentage of desulfurization is attained using lesser amounts of a catalyst and molecular oxygen than in the prior processes.

The present invention is an improvement in a process for the desulfurization of hydrogen sulfide-containing gases by contacting a hydrogen sulfide-containing gas with an aqueous alkaline solution containaing a naphthoquinonesulfonate to cause absorption of hydrogen sulfide by the aqueous solution and catalytically oxidizing the absorption solution this obtained by means of a molecular oxygencontaining gas to deposit elementary sulfur, which comprises (a) carrying out the contact of the hydrogen sulfide-containing gas using an absorption solution adjusted of its pH to 8 to 10 by ammonia and containing as catalyst components a naphthoquinonesulfonate and a variable valent metal compound, (b) carrying out the catalytic oxidation of the absorption solution containing absorbed therein hydrogen sulfide by using a molecular oxygencontaining gas to lower the hydrosulfide ion concentration of the absorption solution to 70 ppm or less and (c) recirculating at least portion of the absorption solution to the contact with the hydrogen sulfide-containing gas.

Namely, in accordance with the present invention, desulfurization of hydrogen sulfide-containing gases is accomplished by contacting the hydrogen sulfide-containing gas with an absorption solution having a pH adjusted by ammonia to 8 to 10 and containing catalyst components a naphthoquinonesulfonate and a variable valent metal compound, contacting the hydrogen sulfide-absorbed absorption solution with a molecular oxygen-containing gas to isolate elementry sulfur and, thereby, to lower the hydrosulfide ion concentration in the absorption solution to 70 ppm or less and recirculating the absorption solution to contact with the hydrogen sulfide-containing gas.

In accordance with the process of the present invention, the aforesaid drawbacks in the prior processes are eliminated and the aforesaid objects are attained and, in addition, some other advantages, e.g. suppression of formation of thiosulfates and sulfates through side-reactions, reduction of consumption of alkaline substance and increase in recovery of sulfur, are brought about, by use of the catalyst composition and the absorption solution of the composition as designated above. The use of the absorption solution which contains a catalyst comprising a naphthoquinonesulfonate in combination with a variable valent metal compound and the pH of which is adjusted by ammonia to an ammoniacal alkalinity causes a high rate of oxidation of hydrosulfides absorbed in the absorption solution and reduced amounts of catalyst and molecuar oxygen for getting the same percentage of desulfurization compared with the use of the absorption solution containing a naphthoquinonesulfonate and alkalised by sodium hydroxide as in the prior process.

The present invention will be understood best in connection with the accompanying drawing wherein;

FIGURE is a flowsheet given for illustrating an embodiment of the process of the present invention.

The naphthoquinonesulfonate used in the process of the present invention may easily be obtained by, e.g., reacting naphthoquinone with a bisulfite in the presence of water, as disclosed in Journal of American Chemical Society, 57, 491 - 4 (1935), and usually be used in the form of a mixture of a naphthohydroquinone-2-sulfonate and a small amount of 1-oxo-4-oxy-2,3-dihydronaphthalene-2,4-disulfonate. The naphthoquinonesulfonate and naphthohydroquinonesulfonate may be any of water soluble salts of naphthoquinonesulfonic acid and naphthohydroquinonesulfonic acid, though usually used are sodium, potassium, lithium and like alkali metal salts and ammonium salts.

In the ammoniacally alkaline absorption absorption solution, the naphthoquinonesulfonate or mixture of naphthoquinonesulfonate and naphthohydroquinonesulfonate may be used in a concentration by weight of 10 to 2,000, preferably 30 to 1,500 and more desirably 30 to 800 ppm.

In the process of the present invention there can be obtained a quite satisfactory result by using as a cocatalyst a variable valent metal compound for retaining the activity of the naphthoquinonesulfonate as a catalyst high. The representatives of the variable valent metals ae iron, chromium, manganese, vanadium, copper, cobalt and nickel, and these metals may be used in the form of compounds which do not form insoluble precipitates in the ammoniacally alkaline absorption solution, usually in the form of organic or inorganic acid salts, metallic acid salts, complex salts or chelates, such as, e.g., iron (III) sodium oxide ($NaFeO_2$), ferrous thiocyanate, ferric thiocyanate, sodium ammonium ferricyanide, ammonium ferrocyanide, ammonium ferricyanide, sodium ferricyanide, sodium ferrocyanide, potassium ferricyanide, potassium ferrocyanide, sodium potassium ferricyanide, iron-ethylenediaminetetraacetate (ethylenediaminetetraacetate hereinafter will be referred to as "EDTA"), manganous sulfate, ammonium manganese (II) sulfate, manganic chloride, ammonium, sodium, potassium, calcium and barium salts of permanganic acid, ammonium, sodium and potassium salts of manganic acid, potassium hexacyanomanganite, manganese acetate, manganese acetylacetonate, manganese-EDTA, sodium vanadate, ammonium metavanadate, potassium metavanadate, vanadium sulfate, vanadyl sulfate, vanadium chloride, vanadyl chloride, copper sulfate, potassium tetracyanocuprite, copper (I) thiocyanate, copper phthalocyanin, copper-EDTA, copper acetylacetonate, ammonium, sodium and potassium salts of chromic acid, ammonium, sodium and potassium salts of bichromic acid, ammonium tetrathiocyanatediaminechromate, chromium-EDTa, ammonium cobalt (II) sulfate, ammonium cobalt chloride, cobalt acetate, potassium hexacyanocobaltate, sodium hexacyanocobaltate, cobalt-EDTA, ammonium nickel (II) sulfate, ammonium nickel chloride, nickel sulfate, potassium tetracyanoniccolate and nickel-EDTA. These componds may be used either alone or in mixture thereof in a total amount by weight of 0.01 to 1,000, preferably 0.1 to 100 ppm in the aqueous absorption solution.

The pH value of the absorption solution is previously adjusted by means of ammonia to 8 to 10, preferably to 8.5 to 9.5. The ammonia is used as a pH controller in the present invention for the reason that (a) ammonia contained in a gas to be treated is utilized effectively as a source of alkali for retention of pH, (b) it is commercially available inexpensively, (c) it has a buffer capacity to keep the pH of the recirculating solution constant, and (d) it has a large absorption capacity for hydrogen sulfide and increases the rate of oxidation of $HS^-$ ion.

The hydrogen sulfide-containing gases to which the process of the present invention is applied include coke oven gas, petroleum cracking gas, natural gas and various waste gases. These gases contain, other than hydrogen sulfide, hydrogen cyanide, hydrogen, methane, ammonia, carbon dioxide, carbon monoxide and other gaseous compounds, and, among those ingredients, hydrogen sulfide, hydrogen cyanide and ammonia are eliminated quite effectively in the process of the present invention. Namely, hydrogen sulfide is eliminated at a rate of 99 % or more and hydrogen cyanide is at a rate of 93 % or more and they are recovered in the form of elementary sulfur and rhodanate, respectively. When a gas to be treated contains ammonia, the harmful ammonia is also absorbed and conveniently utilized as a source of alkali for retention of the pH of the absorption solution.

Illustrating the process of the present invention with referrence to the accompanying drawing, a hydrogen sulfide-containing gas to be treated is introduced through pipe 1 into absorption column 2. The absorption column 2 may be a packed column, plate column, lattice column, spray column or column of any other type. Although a gas to be introduced into the absorption column usually contains hydrogen sulfide $H_2S$ in a concentration of 1 to 10 $g/m^3$, it may contain hydrogen cyanide (HCN) as a compound to be collected in a concentration of 0.2 to 5 $g/m^3$. The top of the absorption column 2 is provided with nozzle 4 through which an absorption solution having a pH adjusted by ammonia to 8 to 10, preferably to 8.5 to 9.5 and containing a naphthoquinonesulfonate and/or a naphthohydroquinonesulfonate and a variable valent metal compound as a cocatalyst is sprayed into the column at a gas/liquid ratio (feed rate of solution/feed rate of gas to be treated) of 5 to 30 liter/$m^3$. The liquid-gas contact is carried out at temperatures of about 5° to about 80° C, preferably about 15° to about 50° C and more preferably about 20° to 40° C. The resident time of the gas in the absorption column 2 is 10 to 90 seconds and in the column hydrogen sulfide and hydrogen cyanide in the feed gas are absorbed by the absorption solution and retained therein almost in the form of hydrosulfide ion $HS^-$ and of cyan ion $CN^-$. The absorption solution thus absorbed $HS^-$ ion or both $HS^-$ ion and $CN^-$ ion is withdrawn by means of pump 5 from the bottom of the absorption column and fed through pipe 6 into oxidation column 7. On the other hand, the gas from absorption column 2 which at least 99 % of $H_2S$ and at least 93 % of HCN contained therein have been eliminated through contact with the absorption solution is led from the top of the absorption column to outside the system through exhaust pipe 3.

The absorption solution introduced into the bottom of the oxidation column 7, containing $HS^-$ and $CN^-$ usually in a concentratiion of 70 to 2,000 ppm and of 1 to 1,000 ppm, respectively, is contacted with bubbles of a molecular oxygen-containing gas supplied from gas ejection pipe 8 located in the bottom of the oxidation column 7. Upon the contact, $HS^-$ ion is oxidized by the naphthoquinonesulfonate to form elementary sulfur and $CN^-$ ion is converted through rhodanation into a rhodanate.

The naphthoquinonesulfonate served as a catalyst is reduced to a naphthohydroquinonesulfonate. The variable valent metal compound used as a cocatalyst serves not only as a promotor for oxidation of hydrosulfide ion but also as an oxygen carrier for reaction of oxidizing the reduction product, naphthohydroquinonesulfonate, by molecular oxygen and, thus, it accelerates redox reaction. Since there are contained thiosulfates, thiocyanates, hydrosulfites and like reductive substances in the absorption solution, there is established an equilibrium among the naphthoquinonesulfonate, naphthohydroquinonesulfonate and dissolved oxygen, and, even if a naphthohydroquinonesulfonate is used as the catalyst component, after a steady state is reached, there is established the same equilibrium by the action of dissolved oxygen.

As the oxidation column 7 there may be employed one of bubble or spray column. As the molecular oxygen-containing gas supplied by means of blower 9 to the gas ejecting pipe 8, there may usually be used air and the air is supplied at a rate as to supply molecular oxygen at a rate of at most 12 times the volume rate of the absorption solution, preferably of 0.2 to 1 times, i.e., at a rate of at most 10, preferably 1 to 5 times the feed rate in volume of the absorption solution. While varies depending on the contact temperature in the absorption column 2, the feed temperature of the molecular oxygen-containing gas may range between about 5° to about 80° C, preferably from 15° to 50° C and more preferably 20° to 40° C. The resident time in the oxidation column of the absorption solution is about 15 to about 45 minutes, and the absorption solution well treated through gas-liquid contact is overflowed from the top of the oxidation column through pipe 10 and, on the other hand, a gas used in the oxidation is exhausted from the top of the column toward outside the system through vent 16.

By the oxidation the concentration of $HS^-$ ion contained in the absorption solution is reduced to 70 ppm or less, e.g., 30 to 70 ppm at the overflow, and portion or the whole of the overflowed solution is transported through pipe 12 into a filter 13 in which elementary sulfur precipitated in the oxidation column 7 is filtered and discharged through line 14. The filtrate is added with the catalyst and cocatalyst through line 14 and with an aqueous ammonia through line 15 for adjustment of its pH and then recirculated by means of pump 18 to the nozzle 4 of the absorption column 2, in case where portion of the absorption solution is filtered, together with the unfiltered balance of the absorption solution transported through pipe 11.

It is surprising that the concentration of $HS^-$ ion in the absorption solution discharged from the oxidation column 7 can be maintained at a low level of 70 ppm or less compared with the high level in the prior processes. We have found out that if the concentration of $HS^-$ ion in the absorption solution exceeds 70 ppm there occurs liberation of gaseous $H_2O$ and the absorbing capacity of the absorption solution cannot be maintained at a high level. In the prior processes it is difficult to lower the concentration of $HS^-$ ion contained in the absorption solution leaving the oxidation column to 70 ppm or less even if there is used a large excess of a molecular oxygen-containing gas, while, on the other hand, in accordance with the present invention the aforesaid objects are attainable with ease in operation using a simplified inexpensive plant. This would indicate the superiority of the process of the present invention to the prior processes. It is another advantage of the process of the present invention that in the process of the present invention the load of hydrosulfide ion on the naphthoquinonesulfonate can be made vary high, so that the catalyst is still effective at a low molar ratio of the catalyst concentration to the hydrosulfide ion concentration at the inlet of the oxidation column (NQS salt/$SH^-$) of 0.01 to 0.35 against the effective range in the prior process of 0.4 to 1.5. It has been found that the process of the present invention brings about the following advantages: reduction in consumption of catalyst (reduction in supplement for deterioration or loss), reduction in by-production of thiosulfates and reduction in alkali consumption, increase in sulfur recovery and increase in rhodanate yield in decyanization.

In the following Examples, all ppms are by weight unless otherwise designated.

EXAMPLE 1

In accordance with the process as shown in FIGURE, a gas containing hydrogen sulfide in a concentration of 6 $g/m^3$ and hydrogen cyanide in a concentration of 1.0 $g/m^3$ prepared by mixing a mixed gas consisting of 5 % by volume of carbon dioxide and 95 % by volume of nitrogen with the aforesaid compounds was introduced through pipe 1 at a rate of 200 liters/hr into absorption column 2 which consisted of a jacketed glass tube of an inner diameter of 55 mm and a height of 1,500 mm packed with glass spheres of a diameter of 6 mm to a height of 1,000 mm, through which jacket there was circulated warm water at a temperature of $(25 \pm 2)0°$ C. An absorption solution containing a mixture of ammonium naphthohydroquinonesulfonate and ammonium naphthoquinonesulfonate (hereinafter referred to as "$NQS-NH_4$") as catalyst components in a concentration of 130 ppm, potassium ferrocyanide in a concentration of 10 ppm and potassium permanganate in a concentration of 9 ppm and adjusted of its pH to 8.5 by ammonia was sprayed at a rate of 3.0 liters/hr through nozzle 4 located in the top of the absorption column 2 for absorption of $H_2S$ and HCN. The gas treated in the absorption column 2 was exhausted from exhaust pipe 3 outside the system. The exhaust gas was analysed by means of Kitagawa's detector tubes and the catalyst components were added to the absorption solution fed to the nozzle 4 and, at the same time, the pH of the absorption solution was adjusted by an aqueous ammonia as to maintain the desulfurization of at least 99 % and the decyanization of at least 93 %. From the bottom of the absorption column 2 the absorption solution was withdrawn by means of constant feed pump 5 and transported through pipe 6 to the bottom of oxidation column 7 which consisted of a jacketed glass tube of an inner diameter of 34 mm and a height of 1,120 mm through which jacket there was circulated warm water at a temperature of $(25 \pm 2(0°$ C. Air was blown thereinto through gas ejecting pipe 8 located in the bottom of the column 7 at a rate of 4 liters/hr to carry out oxidation of the absorption solution. The absorption solution flowed out of the top of the oxidation column 7 was led through pipe 10. One half was transported through pipe 12 to filter 13 in which precipitated elementary sulfur was separated and the filtrate was added with catalyst components and an aqueous ammonia through line 14 and 15 to adjust the catalyst concentration and the pH value. The filtrate was then combined with the other half of the absorption solution and fed to the nozzle 4 in the absorption column 2. The air used for oxidation was released through vent 16. In the exhaust air there was not detected any $H_2S$, HCN or $NH_3$. The hydrosulfide ion concentration determined on the absorption solution withdrawn from the pipe 10 every 10 hours was kept constant within the range of 35 to 45 ppm. The above run was continued for 125 hours and thereafter the quantities of precipitated elementary sulfur, rhodanate yielded and thiosulfate by-produced were determined and the results were as summarized in the following Table 1.

EXAMPLES 2 to 5

The same procedure as in Example 1was repeated except that the concentration of ammonium naphthohydroquinonesulfonate as catalyst, the cocatalyst and its concentration, the pH of the absorption solution, the feed rate of a gas to be treated, the concentrations of $H_2S$ and HCN, the feed rate of the absorption solution to the absorption column, the gas/liquid ratio and the feed rate of oxidizing air to the oxidation column were varied as indicated in the Table 1.

Table 1

| Example No. | 1 | 2 | 3 | 4 | 5 |
|---|---|---|---|---|---|
| Catalyst | NQS—NH$_4$ (130) | NQS—NH$_4$ (100) | NQS—NH$_4$ (80) | NQS—NH$_4$ (100) | NQS—NH$_4$ (80) |
| Components | K$_4$[Fe(CN)$_6$] (10) | K$_4$[Fe(CN)$_6$] (10) | K$_4$[Fe(CN)$_6$] (10) | Cu-EDTA (15) | Cu-EDTA (15) |
| (conc. ppm) | KMnO$_4$ (9) | KMnO$_4$ (9) | KMnO$_4$ (9) | Mn-EDTA (10) | MnSO$_4$ (10) |
| PH adjuster | Ammonia | Ammonia | Ammonia | Ammonia | Ammonia |
| pH | 8.5 | 8.5 | 8.5 | 9.0 | 9.0 |
| Gas feed (liter/hr) | 200 | 200 | 200 | 150 | 370 |
| H$_2$S conc. (g/m$^3$) | 6.0 | 6.0 | 6.0 | 10.0 | 2.0 |
| HCN conc. (g/m$^3$) | 1.0 | 1.0 | 1.0 | 3.0 | 0.3 |
| Absorption soln. feed (liter/hr) | 3.0 | 2.0 | 2.0 | 3.0 | 2.0 |
| Air feed (liter/hr) | 4.0 | 3.0 | 4.0 | 3.0 | 2.0 |
| Soln./gas ratio (liter soln./m$^3$ gas) | 15 | 10 | 10 | 20 | 5 |
| Oxidizing air ratio (liter air/liter soln.) | 1.33 | 1.5 | 2.0 | 1.0 | 1.0 |
| NQS/HS$^-$ molar ratio at inlet of oxidation column | 0.043 | 0.022 | 0.019 | 0.027 | 0.029 |
| HS$^-$ conc. at outlet of oxidizing column (ppm) | 38.1 | 54.7 | 53.0 | 41.8 | 41.1 |
| Continuous running time (hr) | 125 | 120 | 122 | 110 | 111 |
| Desulfurization (mol %) | >99 | >99 | >99 | >99 | >99 |
| Decyanization (mol %) | 93 | 93 | 94 | 94 | 94 |
| Catalyst consumption (mole/kg H$_2$S) | 0.008 0.009 | 0.008 | 0.009 | 0.007 |  |
| Sulfur recovery (mol %) | 70.8 | 68.1 | 69.3 | 45.5 | 74.1 |
| Alkali consumption (kg/kg H$_2$S) | 0.361 | 0.388 | 0.391 | 0.590 | 0.340 |
| Conversion to thiosulfate (mol %) | 7.2 | 8.1 | 8.3 | 8.8 | 7.1 |
| Yield of rhodanate (g) | 60.6 | 57.8 | 61.0 | 108 | 31.0 |

EXAMPLE 6

The same procedure as in Example 1 was repeated except that there were used a mixture of sodium naphthohydroquinonesulfonate and sodium naphthoquinonesulfonate (hereinafter referred to as "NQS-Na") in a concentration of 260 ppm, potassium hexacyanocuprate K$_4$[Cu(CN)$_6$] in a concentration of 20 ppm and potassium permanganate in a concentration of 9 ppm to obtain the results as summarized in the following Table 2.

EXAMPLES 7 to 12

The same procedure as in Example 6 was repeated except that the concentration of sodium naphthohydroquinonesulfonate as catalyst, the kind and concentration of cocatalyst, the pH of an absorption solution, the feed rate of a gas to be treated, the concentrations of H$_2$S and HCN, the feed rate of an absorption solution to the absorption column 2, the gas-liquid ratio and the feed rate of oxidizing air to the oxidation column 7 were varied as indicated in the following Table 2 to obtain the results as summarized in the Table 2.

Table 2

| Example No. | 6 | 7 | 8 | 9 | 10 | 11 | 12 |
|---|---|---|---|---|---|---|---|
| Catalyst | NQS—Na (260) | NQS—Na (130) | NQS—Na (130) | NQS—Na (130) | NQS—Na (130) | NQS—Na (130) | NQS—Na (130) |
| Components | K$_4$[Cu(CN)$_6$] (20) | NH$_4$VO$_3$ (8) | NH$_4$VO$_3$ (8) | NH$_4$VO$_3$ (8) | (NH$_4$)$_2$CrO$_4$ (10) | Co-EDTA (10) | Ni-EDTA (10) |
| (conc. ppm) | KMnO$_4$ (9) | KMnO$_4$ (5) | Mn-EDTA (5) | NaMnO$_4$ (5) | KMnO$_4$ (5) | K$_4$[Mn(CN)$_6$] (10) | NaMnO$_4$ (5) |
| PH adjuster | Ammonia | Ammonia | Ammonia | Ammonia | Ammonia | Ammonia | Ammonia |
| pH | 8.5 | 8.5 | 9.0 | 9.0 | 8.5 | 8.5 | 8.5 |
| Gas feed (liter/hr) | 200 | 200 | 120 | 370 | 200 | 200 | 200 |
| H$_2$S conc. (g/m$^3$) | 6.0 | 6.0 | 10.0 | 2.0 | 6.0 | 6.0 | 6.0 |
| HCN conc. (g/m$^3$) | 1.0 | 1.0 | 3.0 | 0.3 | 1.0 | 1.0 | 1.0 |
| Absorption soln. feed (liter/hr) | 3.0 | 2.0 | 3.0 | 3.0 | 3.0 | 3.0 | 3.0 |
| Air feed (liter/hr) | 4.0 | 3.0 | 3.0 | 3.0 | 4.0 | 4.0 | 4.0 |
| Soln./gas ratio (liter soln./m$^3$ gas) | 15 | 10 | 25 | 8 | 15 | 15 | 15 |
| Oxidizing air ratio (liter air/liter soln.) | 1.33 | 1.5 | 1.0 | 1.0 | 1.33 | 1.33 | 1.33 |
| NQS/HS$^-$ molar ratio at inlet of oxidation column | 0.085 | 0.028 | 0.042 | 0.069 | 0.085 | 0.085 | 0.085 |
| HS$^-$ conc. at outlet of oxidizing column (ppm) | 50.7 | 53.1 | 54.2 | 42.9 | 55.3 | 50.2 | 56.3 |

Table 2-continued

| Example No. | 6 | 7 | 8 | 9 | 10 | 11 | 12 |
| --- | --- | --- | --- | --- | --- | --- | --- |
| Continuous running time (hr) | 125 | 101 | 85 | 88 | 85 | 85 | 85 |
| Desulfurization (mol %) | >99 | >99 | >99 | >99 | >99 | >99 | >99 |
| Decyanization (mol %) | 93 | 94 | 95 | 98 | 93 | 94 | 93 |
| Catalyst consumption (mole/kg $H_2S$) | 0.011 | 0.011 | 0.012 | 0.010 | 0.013 | 0.013 | 0.015 |
| Sulfur recovery (mol %) | 71.1 | 69.9 | 27.3 | 71.0 | 68.8 | 69.0 | 67.0 |
| Alkali consumption (kg/kg $H_2S$) | 0.341 | 0.352 | 0.544 | 0.312 | 0.332 | 0.352 | 0.331 |
| Conversion to thiosulfate (mol %) | 6.1 | 7.3 | 8.5 | 7.6 | 8.8 | 9.2 | 10.1 |
| Yield of rhodanate (g) | 60.8 | 48.5 | 94.8 | 28.8 | 43.5 | 42.1 | 45.5 |

COMPARATIVE EXAMPLE 1

The same procedure as in Example 1 was repeated except that there was used an absorption solution containing NQS-$NH_4$ in a concentration of 30 ppm as catalyst, potassium ferrocyanide in a concentration of 20 ppm and potassium permanganate in a concentration of 9 ppm, the absorption solution was fed to the absorption column 2 at a rate of 2.0 liters/hr and the oxidizing air as fed to the oxidation column 7 at a rate of 2.0 liters/hr. After continuous run for 12 hours, the hydrosulfide ion concentration in the absorption solution leaving the oxidation column 7 reached 83 ppm and the desulfurization percentage was 95 % and the decyanization percentage was 90 %. The results were as summarized in the following Table 3.

COMPARATIVE EXAMPLE 2

The same procedure as in Example 6 was repeated except that there was used an absorption solution containing 40 ppm of sodium naphthoquinonesulfonate as catalyst, 20 ppm of tetrapotassium hexacyanocuprate and 9 ppm of potassium permanganate, the feed rate of the absorption solution to the absorption column was 2.0 liters/hr and the feed rate of the oxidixing air to the oxidation column 7 was 2.0 liters/hr. After continuous run for 11 hours, the hydrosulfide ion concentration in the absorption solution leaving the oxidation column 7 reached 98 ppm, and the percentage desulfurization was 89 % and the percentage decyanization was 85 %. The results were summarized in the Table 3.

COMPARATIVE EXAMPLES 3 to 4

The same procedure as in Example 1 was repeated except that there was used a gas containing $H_2S$ in a concentration of 2.0 g/$m^3$ and HCN in a concentration of 1.0 g/$m^3$ prepared by mixing a mixed gas consisting of 5 % by volume of gaseous carbon dioxide and 95 % by volume of gaseous nitrogen with the two aforesaid compounds, was used an absorption solution containing NQS-Na alone and adjusted of pH to 9.0 with sodium hydroxide and the feed rate of the gas to the absorption column 2, the feed rate of the absorption solution and the feed rate of the oxidizing air to the oxidation column 7 were varied as indicated in Table 3, to obtain the results as summarized in the Table 3.

In Comparative Example 4, after continuous run for 10 hours, the hydrosulfide ion concentration in the absorption solution leaving the oxidation column 7 reached 76 ppm and the percentage desulfurization and percentage decyanization decreased to 95 % and 75 %, respectively. And, in Comparative Example 3, the percentage desulfurization and percentage decyanization were high because of use of sodium naphthoquinonesulfonate in a very high concentration, but the consumption of catalyst was so high as 10 times that in Examples and the recovery of sulfur was low. In Comparative Example 3, the conversion to thiocyanates was high.

Table 3

| Comparative Example No. | 1 | 2 | 3 | 4 |
| --- | --- | --- | --- | --- |
| Catalyst | NQS—$NH_4$ (30) | NQS—Na (40) | NQS—Na (800) | NQS—Na (400) |
| Components (conc. ppm) | $K_4[Fe(CN)_6]$ (20) $KMnO_4$ (9) | $K_4[Cu(CN)_6]$ (20) $KMnO_4$ (9) | | |
| PH adjuster | Ammonia | Ammonia | NaOH | NaOH |
| pH | 8.5 | 8.5 | 9.0 | 9.0 |
| Gas feed (l/hr) | 200 | 200 | 120 | 200 |
| $H_2S$ conc. (g/$m^3$) | 6.0 | 6.0 | 2.0 | 2.0 |
| HCN conc. (g/$m^3$) | 1.0 | 1.0 | 1.0 | 1.0 |
| Absorption soln. feed (liter/hr) | 2.0 | 2.0 | 3.0 | 3.0 |
| Air feed (liter/hr) | 2.0 | 2.0 | 12.0 | 6.0 |
| Soln./gas ratio (liter soln./$m^3$ gas) | 10 | 10 | 25 | 15 |
| Oxidizing air ratio (liter air/liter soln.) | 1.0 | 1.0 | 4.0 | 2.0 |
| NQS/$HS^-$ molar ratio at inlet of oxidation column | 0.007 | 0.007 | 1.30 | 0.39 |
| $HS^-$ conc. at outlet of oxidizing column (ppm) | 83 | 98 | 70 | 76 |
| Continuous running | 12 | 11 | 120 | 10 |

Table 3-continued

| Comparative Example No. | 1 | 2 | 3 | 4 |
| --- | --- | --- | --- | --- |
| time (hr) | | | | |
| Desulfurization (mol %) | 95 | 89 | 98 | 95 |
| Decyanization (mol %) | 90 | 85 | 93 | 75 |
| Catalyst consumption (mole/kg $H_2S$) | — | — | 0.112 | — |
| Sulfur recovery (mol %) | — | — | 23.3 | — |
| Alkali consumption (kg/kg $H_2S$) | — | — | 0.424 | — |
| Conversion to thiosulfate | — | — | 18.1 | — |
| Yield of rhodanate (g) | — | — | 36.8 | — |

What is claimed is:

1. In a process for the desulfurization of hydrogen sulfide-containing gases by contacting the hydrogen sulfide-containing gas with an aqueous alkali solution containing ammonium naphthoquinonesulfonate to cause absorption of hydrogen sulfide by said absorption solution and catalytically oxidizing by means of a molecular oxygen-containing gas the absorption solution thus obtained to separate out elementary sulfur, the improvement which comprises (a) carrying out the contact of the hydrogen sulfidecontaining gas using an absorption solution adjusted to its pH to 8 to 10 by ammonia and containing as catalyst components 10 to 2000 ppm ammonium naphthoquinonesulfonate and 0.01 to 1000 ppm of a variable valent metal compound, (b) carrying out the catalytic oxidation of the absorption solution containing absorbed therein hydrogen sulfide using a molecular oxygen-containing gas to lower the hydrosulfide ion concentration in the absorption solution after the treatment to 70 ppm or less and (c) recirculating the absorption solution to the contact with the hydrogen sulfidecontaining gas.

2. A process for the desulfurization of hydrogen sulfide-containing gases comprising contacting the hydrogen sulfide-containing gas with an absorption solution adjusted of its pH with ammonia to 8 to 10 and containing as catalysts 10 to 2000 ppm ammonium naphthoquinonesulfonate and 0.01 to 1000 ppm of a compound of a variable valent metal to cause hydrogen sulfide to be absorbed by the absorption solution, contacting the absorption gas which has absorbed hydrogen sulfide with a molecular oxygen-containing gas to isolate elementary sulfur and, thereby, to lower the hydrosulfide ion concentration in said absorption solution to 70 ppm or less and then recirculating said absorption solution to the contacting step for said hydrogen sulfide-containing gas.

3. A process of claim 2 in which the variable valent metal compound is an absorption solution-soluble compound of at least one metal selected from the group consisting of iron, chromium, manganese, vanadium, copper, cobalt and nickel.

4. A process of claim 3 in which the absorption solution-soluble compound is of the form selected from the group consisting of salt, metallic acid salt, complex salt and chelate compound.

5. A process of claim 2 in which the variable valent metal compound is contained in the absorption solution in a concentration of 0.1 to 100 ppm.

6. A process of claim 2 in which the naphthoquinonesulfonate is contained in the absorption solution in a concentration of 30 to 1,500 ppm.

7. A process of claim 2 in which the naphthoquinonesulfonate is contained in the absorption solution in a concentration of 30 to 800 ppm.

8. A process of claim 2 in which the molar ratio of the naphthoquinonesulfonate concentration to the hydrosulfide ion concentration (NQS/HS$^-$) is 0.01 to 0.35.

9. A process for the desulfurization of hydrogen sulfide-containing gas comprising (a) contacting the hydrogen sulfide-containing gas with an absorption solution adjusted of its pH by ammonia to 8 to 10 and containing a ammonium naphthoquinonesulfonate as a catalyst in a concentration of 10 to 2,000 ppm and an absorption solution-soluble compound of at least one metal selected from the group consisting of iron, chromium, manganese, vanadium, copper, cobalt and nickel in a concentration of 0.01 to 1,000 ppm to effect hydrogen sulfide to be absorbed by the absorption solution, (b) contacting the so hydrogen sulfide-absorbed absorption solution with a molecular oxygen-containing gas to separate out elementary sulfur and adjusting the hydrosulfide ion concentration in said absorption solution to 70 ppm or less, and (c) recirculating said absorption solution to the contacting step with said hydrogen sulfide-containing gas.

10. A process of claim 9 in which the ratio of the feed rate of the absorption solution to that of the hydrogen sulfide-containing gas to be treated is 5 to 30 liters-solution/m$^3$-gas.

11. A process of claim 9 in which the pH of the absorption solution is 8.5 to 9.5.

12. A process of claim 9 in which the hydrogen sulfide-containing gas contains hydrogen sulfide in a concentration of 1 to 10 g/m$^3$.

13. A process of claim 9 in which the hydrogen sulfide-containing gas contains hydrogen sulfide in a concentration of 1 to 10 g/m$^3$ and hydrogen cyanide in a concentration of 0.2 to 5 g/m$^3$.

14. A process for the desulfurization of hydrogen sulfide-containing gases comprising (a) contacting a gas containing hydrogen sulfide in a concentration of a degree of 1 to 10 g/m$^3$ with an absorption solution adjusted of its pH by ammonia to 8 to 10 and containing as catalysts ammonium naphthoquinonesulfonate in a concentration of 30 to 800 ppm and a salt, metallic acid salt, complex salt or chelate compound of at least one metal selected from the group consisting of iron, chromium, manganese, vanadium, copper, cobalt and nickel in a concentration of 0.1 to 100 ppm to effect hydrogen sulfide to be absorbed by the absorption solution, (b) contacting the so hydrogen sulfide-absorbed absorption solution containing the naphthoquinonesulfonate and hydrosulfide ion in a molar concentration ratio (NQS/HS$^-$) of 0.01 to 0.35 to separate out elementary sulfur and thereby adjusting the hydrosulfide ion concentration in said absorption solution to 70 ppm or less, and then (c) recirculating said absorption solution to the contacting step of said hydrogen sulfide-containing gas.

15. A process of claim 14 in which the elementary sulfur is recovered from the absorption solution wherein it is separated out through catalytic oxidation.

* * * * *